Patented July 2, 1940

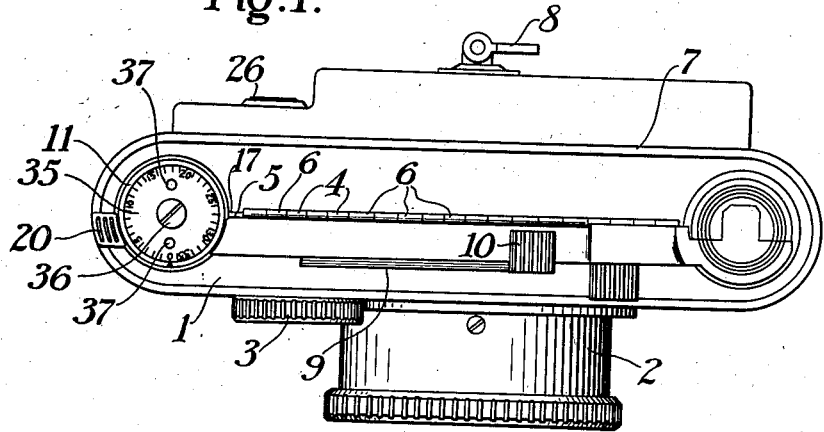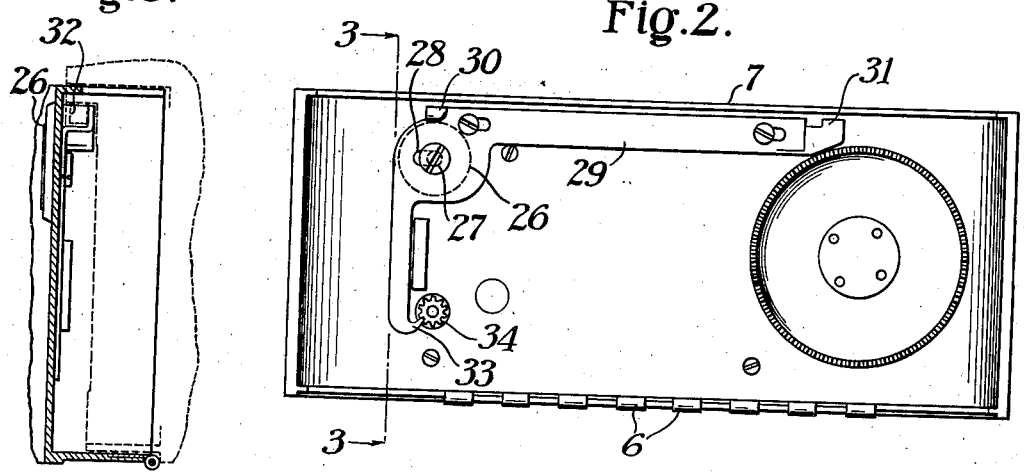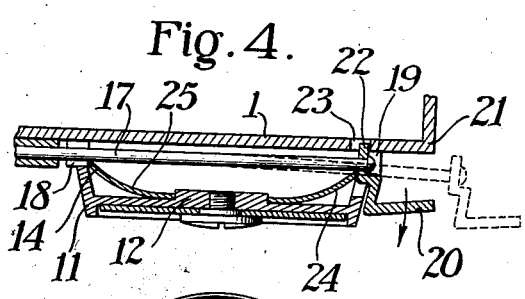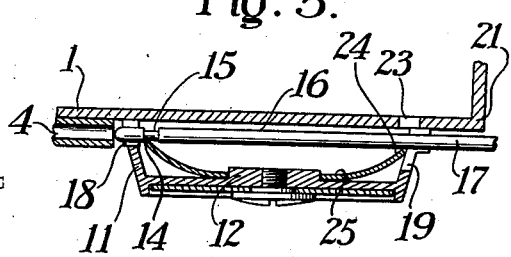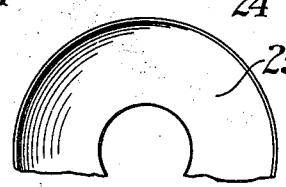

2,206,104

UNITED STATES PATENT OFFICE 2,206,104

SEPARABLE HINGE STRUCTURE

Joseph Mihalyi, Rochester, N. Y., assignor to Eastman Kodak Company, Rochester, N. Y., a corporation of New Jersey Original application July 13, 1937, Serial No. 153,351, now Patent No. 2,135,984, dated November 8, 1938. Divided and this application January 29, 1938, Serial No. 187,719

5 Claims. (Cl. 16—176)

This invention relates to photography and more particularly to a combined latch and hinge construction by which camera parts may be detachably connected to a camera body.

One object of my invention is to provide a separable hinge structure in which the hinge pintle may be moved through a fixed path to engage and release hinge elements so that parts of the hinge may be disconnected. Another object of my invention is to provide a hinge pintle which is slidably attached to a camera body and which is movable between two extremes of movement, in one of which the hinge pintle is operative to connect the hinge elements and in the other of which the hinge pintle is inoperative in that the hinge elements may be separated. Another object of my invention is to provide a spring latch arrangement for holding the hinge pintle in its two extremes of movement and to provide a latch arrangement which can be readily manually released when it is desired to release or change camera parts. Still another object of my invention is to provide a spring latch with a single spring which acts on two different latch elements included in the hinge pintle, one of which is to prevent the hinge pintle from being released from the camera and the other of which is to hold the hinge pintle in its operative position. Still another object of my invention is to provide a small housing containing spring latching elements which cooperate with parts of the pintle, and other objects will appear from the following specification, the novel features being particularly pointed out in the claims at the end thereof.

In my copending applications serially Numbered 153,351 and 153,352, filed July 13, 1937, I have shown a camera particularly adapted for use with various attachments and in the first-mentioned application I have shown, as a typical attachment, the spring motor drive which is used by way of illustration in the present invention. This application is a division of application Serial No. 153,351, which has matured into Patent No. 2,135,984, November 8, 1938.

With cameras of the type described, and sometimes with other types of cameras, it is desirable to have camera parts which may be detachably connected to a camera body, such for instance, as a motor drive unit, a roll holding magazine unit, so that if desired, color film and black and white film may be interchangeably used, or camera backs or magazines adapted to take different sizes of film. The separable hinge structure which will be described herein is particularly suitable for attaching such camera parts because it not only permits the desirable type of hinge connection to be included with the camera body, but it utilizes the hinge elements as part of a latch for attaching the various camera parts.

Coming now to the drawing wherein like reference characters denote like parts throughout:

Fig. 1 shows a bottom plan view of a typical camera constructed in accordance with and embodying a preferred form of my invention.

Fig. 2 is a plan view of the inside of a camera back removed from the camera shown in Fig. 1.

Fig. 3 is an enlarged fragmentary section taken on line 3—3 of Fig. 2, parts of the camera being shown in broken lines.

Fig. 4 is an enlarged fragmentary section through a portion of the hinge pintle latching mechanism with the hinge pintle shown in an operative position.

Fig. 5 is a similar view to Fig. 4, but with the hinge pintle illustrated in its inoperative position in which the hinge elements are released from each other.

Fig. 6 is a partial plan view of a spring element used in the latch shown in Figs. 4 and 5.

As a typical example of my invention, I have shown a camera 1 which is equipped with the usual objective mounted in a barrel 2 which may be focused by turning the knurled ring 3. This camera is provided with a series of hinge elements 4 which are spaced apart at even intervals across the edge 5, these hinge elements being interspaced with hinge element 6 carried by the camera part 7 which is to be attached to the camera body 1. In this instance, the camera part 7 is a power drive and includes a winding key 8 for placing the motor under tension. The construction of the motor drive is completely shown in my copending application Serial No. 153,351, filed July 13, 1937.

The camera may be provided with a slot 9 across the bottom, through which a handle 10 slides to open and close a film magazine as is more fully described in my copending application Serial No. 153,352.

At one end of the camera body 1, I provide a small housing 11 which housing may be conveniently made circular in shape and which is preferably provided with circular lug 12 on the inside of the center as is shown in Figs. 4 and 5. Around this lug I place a spring washer 25, the extreme edge 14 of which forms a latch which is adapted to engage a reduced area or notch 15 positioned near one end 16 of a hinge pintle 17 which is preferably made from spring wire. Since the circular housing 11 has apertures or slots 18 and 19 through which the hinge pintle may slide, this housing contains at least a portion of the latching mechanism designed, first, to prevent the pintle from being totally withdrawn from the camera, and, second, to hold the hinge pintle in an operative or latched position.

Fig. 5 shows the position of the hinge pintle 17 when totally withdrawn from the hinge elements 4 and 6 to release these hinge elements. Fig. 4 shows the position of the hinge pintle when moved to its operative position, in which the hinge elements 4 and 6 are latched together by the pintle to form a hinge.

The hinge pintle carries a handle member 20 which preferably lies between the top of the housing 11 and a wall 21 of the camera so that it cannot readily be accidentally operated. The handle carries an inwardly projecting lug 22 which projects into a slot 23 in the camera body 1 so that when in the position of Fig. 4, the hinge pintle cannot be moved axially.

While the normal springiness of the hinge pintle 17 is usually sufficient to hold the latch elements 22 and 23 in engagement, the springiness of this member is reinforced by one edge 24 of the spring washer 25 which is preferably annular in shape, as shown in Fig. 6. Thus, the two edges 14 and 24 of the spring washer 25, as shown in Fig. 4, both frictionally engage the hinge pintle.

When it is desired to remove the camera part, as camera part 7, the handle 20 is moved downwardly in the direction shown by the arrow in Fig. 4, causing the pintle to flex and causing the edge 24 of the spring washer to become depressed to release lug 22 from notch 23. The handle may then be moved axially causing the pintle 17 to slide through the openings 18 and 19, while an edge 14 of the spring washer frictionally engages the pintle 17 until the notch 15 is reached, at which time the edge 14 snaps into the notch preventing the pintle from being further withdrawn and removed from the camera. Then the hinge elements 4 and 6 will be released, and by sliding a suitable operating knob 26 on the outside of the camera part, shown in Fig. 2, so that a pin 27 moves through a slot 28 and the L-shaped locking bar 29 is moved to release the latch elements 30 and 31 from locking pins 32 on the camera body, as shown in Fig. 3, this camera part can then be released. If the camera part should be a power-driven back, as shown, it is desirable to have a portion 33 of the locking bar 29 enter a gear 34 as soon as the camera part is unlocked so that the motor will not suddenly run down.

It is desirable to have a film indicating dial on the camera to indicate the number of exposures which have been made, and accordingly, I prefer to provide a dial 35 which may turn upon a stud 36 when an operator moves the upstanding pins 37. Thus, this dial can be set for any desired number of exposures and film will not be wasted when the roll holder is again used on the camera.

It is obvious that there are a good many applications in which it is necessary or desirable to hingedly attach camera parts together and to provide in the hinge a latch construction which is simple and effective, and while I have described and illustrated a preferred form of my invention, it will be understood that I am not limited to this form, but only as indicated in the claims attached hereto.

What I claim as my invention and desire to secure by Letters Patent of the United States is:

1. A separable hinge structure for hingedly connecting two camera parts comprising a hinge element mounted on one part and a second hinge element mounted on a second part, said hinge elements being adapted to cooperate, a hinge pintle, means on one part slidably mounting said pintle adjacent the two hinge elements in axial alignment therewith, said mounting means comprising a small circular slotted housing, the pintle sliding through the slots, an annular spring enclosed in the housing, and including an inwardly turned periphery engaging the pintle at spaced points and pressing said pintle toward the camera part, means on the pintle for engaging one edge of the spring and forming one latch to prevent the pintle's withdrawal from the circular slotted housing, latch elements on the pintle and a camera part for holding the pintle in an operative hinge element engaging position and adapted to be held in engagement by an opposite edge of the spring from that engaging the means on the pintle for engaging the spring to prevent withdrawal of the pintle from the housing, whereby the same spring by slidably engaging the pintle, may operate both sets of latch elements.

2. A separable hinge structure for hingedly connecting two camera parts comprising a hinge element mounted on one camera part, a complementary hinge element on a second camera part, a hinge pintle adapted to pass through the complementary hinge elements to hold them together, a mount for the pintle in which a pintle may slide carried by one camera part adjacent the hinge elements, said mount being hollow, a slot in a wall adjacent the hollow mount, a handle and protuberance carried by the hinge pintle, said protuberance being adapted to engage said slot, and a spring carried inside the hollow mount adapted to press against the pintle normally holding the protuberance and slot in latching engagement.

3. A separable hinge structure for hingedly connecting two camera parts comprising a hinge element mounted on one camera part, a complementary hinge element on a second camera part, a hinge pintle adapted to pass through the complementary hinge elements to hold them together, a mount for the pintle in which the pintle may slide carried by one camera part adjacent the hinge elements, said mount being hollow, a slot in a wall adjacent the hollow mount, a handle and protuberance carried by the hinge pintle, said protuberance being adapted to engage said slot, and a spring carried inside the hollow mount adapted to press against the pintle normally holding the protuberance and slot in latching engagement, said pintle also including a part adapted to engage said spring for preventing the pintle from sliding through the hollow mount when moved to release the hinge elements.

4. A separable hinge structure for hingedly connecting two camera parts comprising a hinge element mounted on one camera part, a complementary hinge element on a second camera part, a hinge pintle adapted to pass through the complementary hinge elements to hold them together, a mount for the pintle in which the pintle may slide carried by one camera part adjacent the hinge elements, said mount comprising a circular hollow flanged member with pintle guiding slots therein, a spring carried in the hollow flanged member pressing on the pintle, a handle carried by the pintle, latch elements on the pintle and part carrying the hollow flanged member, the spring by pressing on the pintle being adapted to hold the latch elements in engagement, at least one pintle guiding slot being of sufficient length to allow the pintle to be sprung by its handle to release the latch elements, whereby the pintle may be withdrawn to separate the hinge elements.

5. A separable hinge structure for hingedly connecting two camera parts comprising a hinge element mounted on one camera part, a complementary hinge element on a second camera part, a hinge pintle adapted to pass through the complementary hinge elements to hold them together, a mount for the pintle in which the pintle may slide carried by one camera part adjacent the hinge elements, said mount comprising a circular hollow flanged member with pintle guiding slots therein, a spring carried in the hollow flanged member pressing on the pintle, a handle carried by the pintle, latch elements on the pintle and part carrying the hollow flanged member, the spring by pressing on the pintle being adapted to hold the latch elements in engagement, at least one pintle guiding slot being of sufficient length to allow the pintle to be sprung by its handle to release the latch elements, whereby the pintle may be withdrawn to separate the hinge elements, said pintle handle including a part normally covering a pintle guiding slot and terminating in a bent handle normally adjacent a portion of the hollow flanged member.

JOSEPH MIHALYI.